US006648012B2

United States Patent
Linthorst (10) Patent No.: US 6,648,012 B2
(45) Date of Patent: Nov. 18, 2003

(54) NON-RETURN VALVE OVERRIDE DEVICE (75) Inventor: Eric J. Linthorst, Los Altos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 7 days.

(21) Appl. No.: 09/882,327

(22) Filed: Jun. 13, 2001

(65) Prior Publication Data

US 2002/0189687 A1 Dec. 19, 2002

(51) Int. Cl.$^7$ .............................................. F16K 15/18
(52) U.S. Cl. ........................ 137/522; 251/65; 137/529
(58) Field of Search .......................... 137/1, 522, 528, 137/529, 535, 538, 539, 540, 533.11, 523; 251/65, 129.03, 129.15, 129.21, 129.22

(56) References Cited

U.S. PATENT DOCUMENTS

| 2,700,395 A | * | 1/1955 | Young ........................ 137/523 |
| 3,833,015 A | | 9/1974 | Kneuer ....................... 137/334 |
| 4,252,094 A | | 2/1981 | Draxler ............... 123/198 DB |
| 4,321,021 A | | 3/1982 | Pauliukonis ................ 417/374 |
| 4,792,113 A | * | 12/1988 | Eidsmore ..................... 251/65 |
| 4,874,012 A | * | 10/1989 | Velie ........................... 137/557 |
| 5,022,359 A | | 6/1991 | Erickson et al. .......... 123/90.14 |
| 5,069,239 A | * | 12/1991 | Bunce et al. ............. 137/15.04 |
| 5,259,345 A | | 11/1993 | Richeson ................. 123/90.12 |
| 5,368,013 A | | 11/1994 | Herweyer .................... 126/362 |
| 5,421,366 A | | 6/1995 | Naffziger et al. ......... 137/614.2 |
| 5,605,317 A | | 2/1997 | Mealy et al. ........... 251/129.01 |
| 6,050,294 A | | 4/2000 | Makowan .................... 137/527 |
| 6,131,877 A | * | 10/2000 | Kerger et al. ................. 251/65 |
| 6,152,171 A | | 11/2000 | Messick et al. ......... 137/543.13 |
| 6,164,322 A | * | 12/2000 | Najmolhoda et al. ........ 137/540 |
| 6,168,400 B1 | | 1/2001 | Van Davelaar et al. ..... 417/571 |

FOREIGN PATENT DOCUMENTS

FR 1298519 * 12/1962
JP 360164082 A * 8/1985

* cited by examiner

Primary Examiner—Michael Powell Buiz
Assistant Examiner—Ramesh Krishnamurthy
(74) Attorney, Agent, or Firm—Moser Patterson & Sheridan, LLP.

(57) ABSTRACT

An improved non-actuated non-return valve, the valve including a non-magnetic valve body having a substantially hollow interior portion in communication with a gas inlet and a gas outlet. A mechanically biased flow check assembly is positioned within the substantially hollow interior portion, the mechanically biased flow check assembly being configured to permit a gas flow from the gas inlet to the gas outlet. A first magnetic member may be provided and be in communication with the mechanically biased flow check assembly within the substantially hollow interior portion. A second magnetic member detachably positioned adjacent an exterior portion of the valve body may be provided, wherein a magnetic field of the second magnetic member is configured to impart motion to the mechanically biased flow check assembly when positioned proximate the exterior portion of the valve body.

19 Claims, 9 Drawing Sheets

NON-RETURN VALVE OVERRIDE DEVICE

BACKGROUND OF THE INVENTION

1. Field of the Invention

The present invention generally relates to check valves in communication with a vacuum system.

2. Description of the Related Art

Non-return valves, also known as check valves, are generally configured to control the direction of a gas and/or liquid flow through a conduit. More particularly, a typical non-return valve operates to permit a gas and/or liquid flow in one direction, while prohibiting the same gas and/or liquid from flowing in an opposite direction. Therefore, non-return valves are very useful as safety devices, as they may be utilized to prevent back streaming of toxic and/or corrosive gases into a gas supply.

In the semiconductor manufacturing industry, for example, non-return valves are often used as a safety device positioned between a house gas supply and a semiconductor fabrication device. In this implementation, the non-return valve maybe positioned such that the gas flow is allowed to travel in the direction of the semiconductor fabrication device from the house gas supply. Therefore, gases may be provided to the semiconductor fabrication device, but not allowed to reverse the direction of flow and return to the house gas supply. As such, in the situation where a plurality of gases are mixed in a gas supply leading to a semiconductor manufacturing device, the mixture of gases is not allowed to then flow back into a pure gas supply house, which would then contaminate the entire gas supply.

Generally, there are two types of non-return valves: first, actuated non-return valves, and second, non-actuated and/or biased flow control valves. Actuated flow control valves generally include an actuator, such as a solenoid, built into the valve body into the actuated non-return valve, such that the solenoid/actuator may be activated to selectively open and/or close the non-return valve. Therefore, an electrical signal indicating to the solenoid and/or actuation device that the non-return valve is to be opened/or closed is generally required in order to operate the actuated non-return valve. Therefore, actuated non-return valves are generally in communication with an electronic controller, wherein the electronic controller is configured to sense a flow pressure differential across the actuated non-return valve in order to determine when the actuated non-return valve should be opened and/or closed to provide proper gas flow. For example, if the valve controller determines that the pressure differential across the actuated non-return valve is, for example, one-third PSI wherein the greater pressure is present on the front side of the valve, then the controller may be configured to close the non-return valve, as a gas back-flow situation is present.

Alternatively, non-actuated and/or biased non-return valves operate to prevent back-flow without using an actuator. Generally, non-actuated, non-return valves utilize a spring and/or biasing device in communication with a valve opening/closing device, wherein the spring and/or biasing device is configured to provide force sufficient to close the valve opening and/or closing device when a back-flow situation occurs. For example, a non-return valve may include a valve plunger configured to open and/or close in order to allow gas to flow and/or be stopped through the non-return valve. A biasing spring may be in communication with the valve plunger such that the biasing spring biases the valve plunger to a closed position. However, when sufficient pressure is present on the back side of the non-return valve, this pressure operates to open the valve plunger and allow gas to flow through the non-return valve, assuming that the gas pressure is sufficient to overcome the biasing force applied to the valve plunger by the biasing spring. Therefore, in similar fashion to actuated non-return valves, when the pressure on the front side of the non-return valve becomes greater than the pressure on the back side of the non-return valve, i.e., when the gas supply pressure is less than the gas back-flow pressure, then the biasing spring operates to bias the valve plunger to a closed position and prevent gas back-flow.

Although actuated and non-actuated non-return valves generally provide acceptable operational characteristics, non-actuated non-return valves have some advantages over actuated non-return valves. In particular, non-actuated non-return valves do not require an electronic controller and/or pressure sensors in order to effectively prevent gas back-flow and/or back streaming into gas supply sources. As such, not only is the need for additional control devices eliminated, the number of potential trouble shooting elements in a failure situation is minimized. Further, since non-actuated non-return valves do not require external controllers and/or electrical impulses, non-actuated non-return valves provide an additional level of safety, as the valves automatically close in power outage-type situations.

However, non-actuated non-return valves suffer from a disadvantage, in that they generally do not allow for full evacuation of the gas end or fluid conduit, as the non-actuated non-return valve will close when the pressure on the front side of the valve becomes equal to and/or slightly greater than the pressure on the back side of the valve. In the semiconductor manufacturing industry, for example, this is a substantial disadvantage, as it is very difficult and/or impossible to achieve effective out gassing of the conduit line and/or to find small leaks in the line.

Therefore, there exists an need of a non-actuated non-return valve, wherein the valve is configured to receive a manual override, so that out gassing and/or leak checking operations may be conducted on the conduit in communication with the back side (supply side) of the non-return valve.

SUMMARY OF THE INVENTION

Embodiments of the invention generally provide an improved non-actuated non-return valve, the valve including a non-magnetic valve body having a substantially hollow interior portion in communication with a gas inlet and a gas outlet. A mechanically biased flow check assembly is positioned within the substantially hollow interior portion, the mechanically biased flow check assembly being configured to permit a gas flow from the gas inlet to the gas outlet. A first magnetic member may be provided and be in communication with the mechanically biased flow check assembly within the substantially hollow interior portion. A second magnetic member detachably positioned adjacent an exterior portion of the valve body may be provided, wherein a magnetic field of the second magnetic member is configured to impart motion to the mechanically biased flow check assembly when positioned proximate the exterior portion of the valve body.

Embodiments of the invention further provide an improved non-return valve having a valve body and a substantially hollow interior portion. The valve further includes a non-actuated flow check assembly positioned between a gas inlet and a gas outlet, the gas inlet and gas outlet being in communication with the substantially hollow interior portion. A first magnetic device in mechanical communication with the flow check assembly is provided, and a magnetic member detachably positioned proximate an exterior portion of the valve body is included, wherein a magnetic field of the second magnetic member is configured to impart motion to the non-actuated flow check assembly when positioned proximate the exterior portion of the valve body.

Embodiments of the invention further provide an improved non-actuated non-return valve, the valve including a valve body having a substantially hollow interior portion and a non-actuated flow check assembly positioned between a gas inlet and a gas outlet, the gas inlet and gas outlet being in communication with the substantially hollow interior portion. The valve further includes a means for interacting with a magnetic field in mechanical communication with the flow check assembly, and a means for generating a magnetic field detachably positioned proximate an exterior portion of the valve body. The valve being configured such that the magnetic field of the means for generating a magnetic field is configured to impart motion to the non-actuated flow check assembly via the means for interacting with a magnetic field when the means for generating a magnetic field is positioned proximate the exterior portion of the valve body.

Embodiments of the invention further provide a method for mechanically actuating a non-actuated non-return valve. The method includes the steps of positioning a first magnetic device on a flow check assembly within the non-actuated non-return valve, and positioning a second magnetic device proximate an exterior portion of the non-actuated non-return valve. The positioning steps are configured to that a magnetic field generated by the second magnetic device operates to actuate the flow check assembly to an open position.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
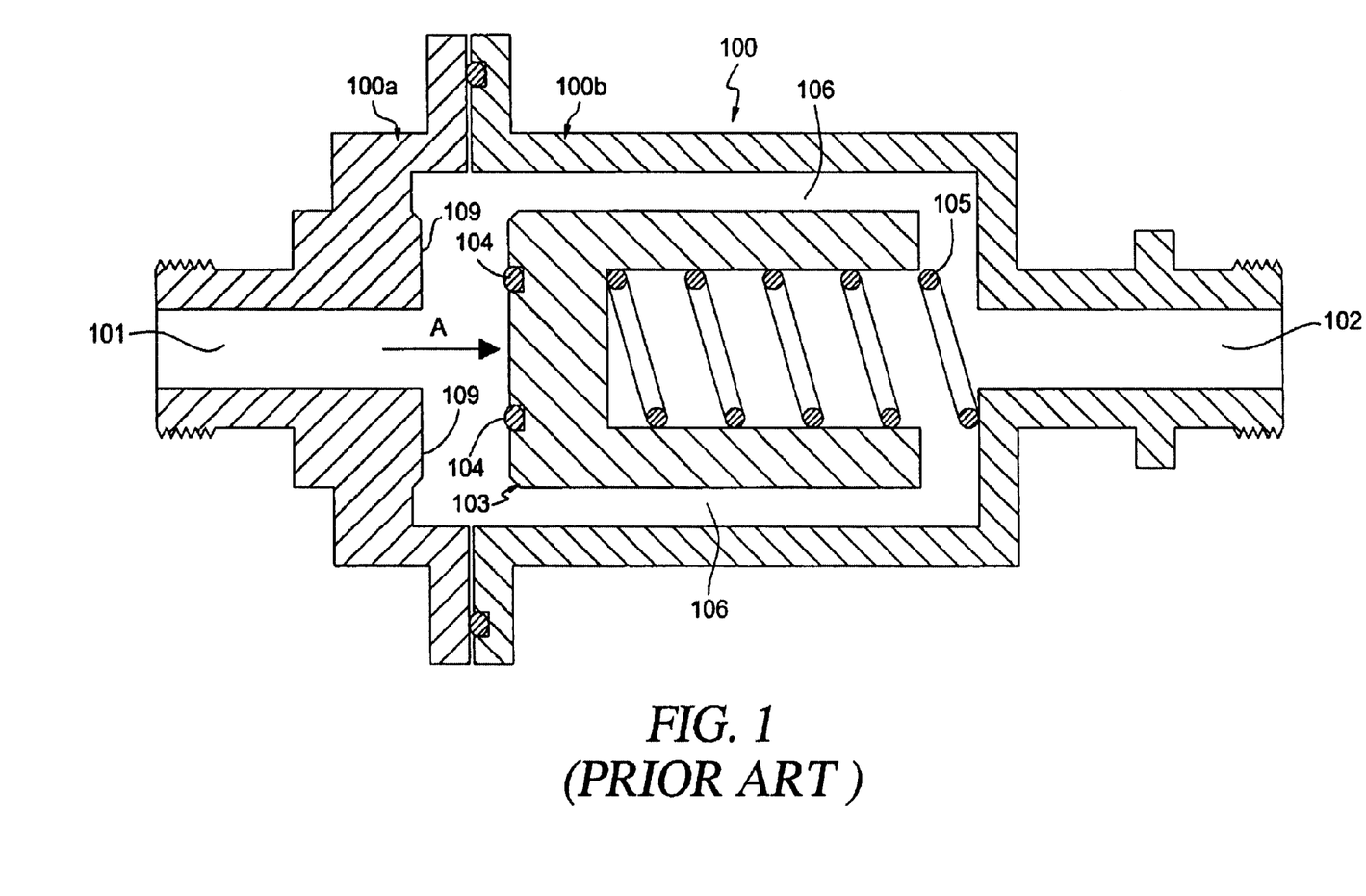
FIG. 1 (Prior Art) is a conventional non-actuated non-return valve.

FIG. 1 illustrates a conventional non-actuated non-return/check valve 100. Check valve 100 generally includes a first outer valve body half 100a in communication with a second outer body half 100b, wherein the first and second body halves cooperatively form check valve 100. First body half 100a includes a gas/fluid inlet 101 in communication with an interior flow passage 106. Second body half 100b includes a flow outlet 102 that is also in communication with interior flow passage 106. A flow check assembly 103 configured to block interior flow passage 106 from being in communication with flow inlet 101 is positioned within flow passage 106. A biasing spring 105 engages flow check assembly 103 to impart longitudinal movement to flow check assembly 103. The longitudinal movement imparted to flow check assembly 103 by biasing spring 105 causes an annular ring-type seal 104 to contact and/or be separated from an inner surface of first body half 100a. This contact and/or separation of seal 104 from first body half 100a operates to either stop and/or initiate fluid/gas flow through check valve 100.

In operation, check valve 100 is generally configured to allow fluid/gas to flow therethrough in the direction indicated by arrow A. Therefore, assuming check valve 100 is implemented in a gas supply line of semiconductor processing system, then flow inlet 101 would generally be in communication with a gas source, while flow outlet 102 would be in communication with a conduit configured to provide a gas flow to the semiconductor processing system. Therefore, when the pressure of the gas supply reaches flow inlet 101 and contacts flow check assembly 103, the pressure of the gas supply will impart longitudinal motion to flow check assembly 103 in the direction of arrow A. This longitudinal motion compresses biasing spring 105, separates seal 104 from contact with first body half 100a, and allows gas to flow through check valve 100 from flow inlet 101 to flow outlet 102 via flow passage 106.

However, in the situation where the gas supply pressure entering check valve 100 via flow inlet 101 drops below a back pressure exerts on check valve 100 by a back streaming gas entering check valve 100 through flow outlet 102, flow check assembly is caused to longitudinally move in a direction opposite of the arrow indicated by capital letter A in order to stop the flow of any back streaming gas into a gas source in communication with flow inlet 101. Therefore, biasing spring 105 is generally configured to exert a sufficient biasing force on flow check assembly 103 to maintain contact between seal 104 and first body half 100a in the situation where the pressure at flow outlet 102 is greater than the pressure at flow inlet 101. Various biasing springs 105 having varying spring constants and/or stiffness factors may be implemented in check valve 100 in order to provide a specific biasing force for a particular implementation. However, one disadvantage with check valve 100 is that the user of the system has no way of manually actuating flow check assembly 103 to allow gas flow through check valve 100, other than artificially providing the pressure differential required to impart longitudinal motion to flow check assembly 103. Therefore, for example, in the situation where the user desires to outgas and/or leak check the conduit to which check valve 100 is in communication, the user has no way to manually open and/or close the valve in order to accomplish these functions.

Figure 2:
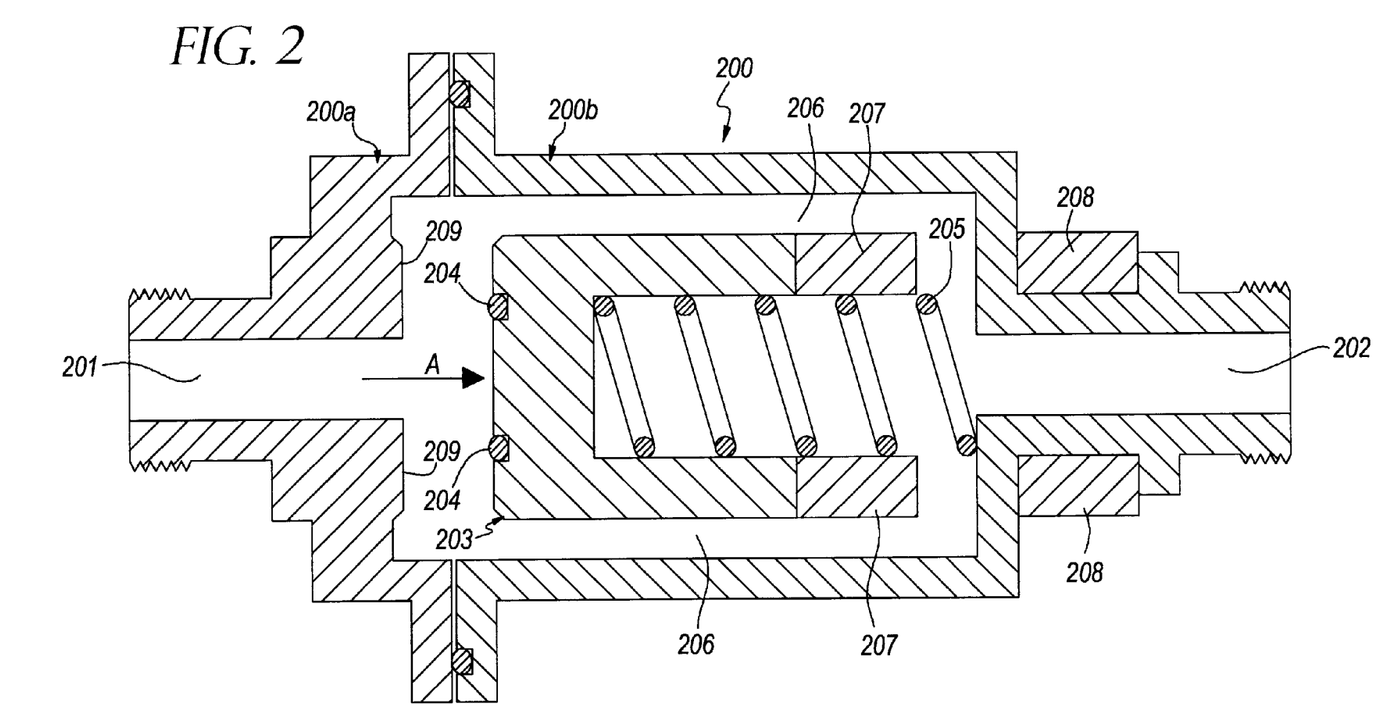
FIG. 2 illustrates an embodiment of a non-actuated non-return valve of the invention.

FIG. 2 illustrates an exemplary embodiment of a check valve 200 of the invention. Check valve 200 includes a first body half 200a in communication with a second body half 200b, wherein the respective body halves cooperatively form the body for check valve 200. First body half 200a includes a gas flow inlet 201, and second body half 200b includes a gas flow outlet 202. Gas flow inlet 201 is in communication with gas flow outlet 202 via an interior gas flow passage 206. However, the gas flow communication between gas flow inlet 201 and gas flow inlet 202 may be selectively interrupted by flow check assembly 203. Flow check assembly 203 includes a seal 204 configured to engage a seal surface 209 formed on an interior portion of first body half 200a. A biasing spring 205 engages flow check assembly 203 to bias flow check assembly 203 in the direction of arrow B. Further, flow check assembly 203 includes magnetic portions 207 at the distal end of flow check assembly 203.

Therefore, check valve 200, during normal operation, operates in similar fashion to check valve 100 shown in FIG. 1. However, in the situation where the user desires to outgas and/or leak check the conduit to which check valve 200 is in communication with, check valve 200 allows for manual actuation of flow check assembly 203 such that outgassing and/or leak checking may be conducted. In particular, an external magnet 208 may be affixed to the outer surface of first body half 200b at a position proximate flow outlet 202, such that the magnetic field of magnet 208 operates to attract magnetic portions 207 thereto. As such, when magnet 208 is affixed to the exterior portion of first body half 200b, flow check assembly 203 may be longitudinally actuated in the direction indicated by arrow A towards magnet 208. This longitudinal actuation operates to separate seal 204 from sealing surface 209, which allows for gas to flow through check valve 200 via internal flow check passage 206. As such, the user may thereafter conduct effective outgassing and/or leak checking of the line to which check valve 200 is in communication with.

Therefore, the application of magnet 208 to the external surface of check valve 200 operates to allow a user to manually manipulate the internal portions of check valve 200 without having to disassemble the valve. Furthermore, when the user desires the valve to return to normal operation, i.e., in a normal flow situation wherein outgassing and/or leak checking operations are not taking place, then the user may simply remove magnet 208 from check valve 200, and normal operation will resume. Additionally, in order to clearly indicate to the user of check valve 200 that the operation of flow check assembly 203 has been bypassed, magnet 208 may be manufactured to be of a conspicuous size and/or color. As such, the user would easily recognize that magnet 208 were present on check valve 200, and therefore, recognize that the flow check assembly operation of check valve 200 had been disabled.

Figure 3:
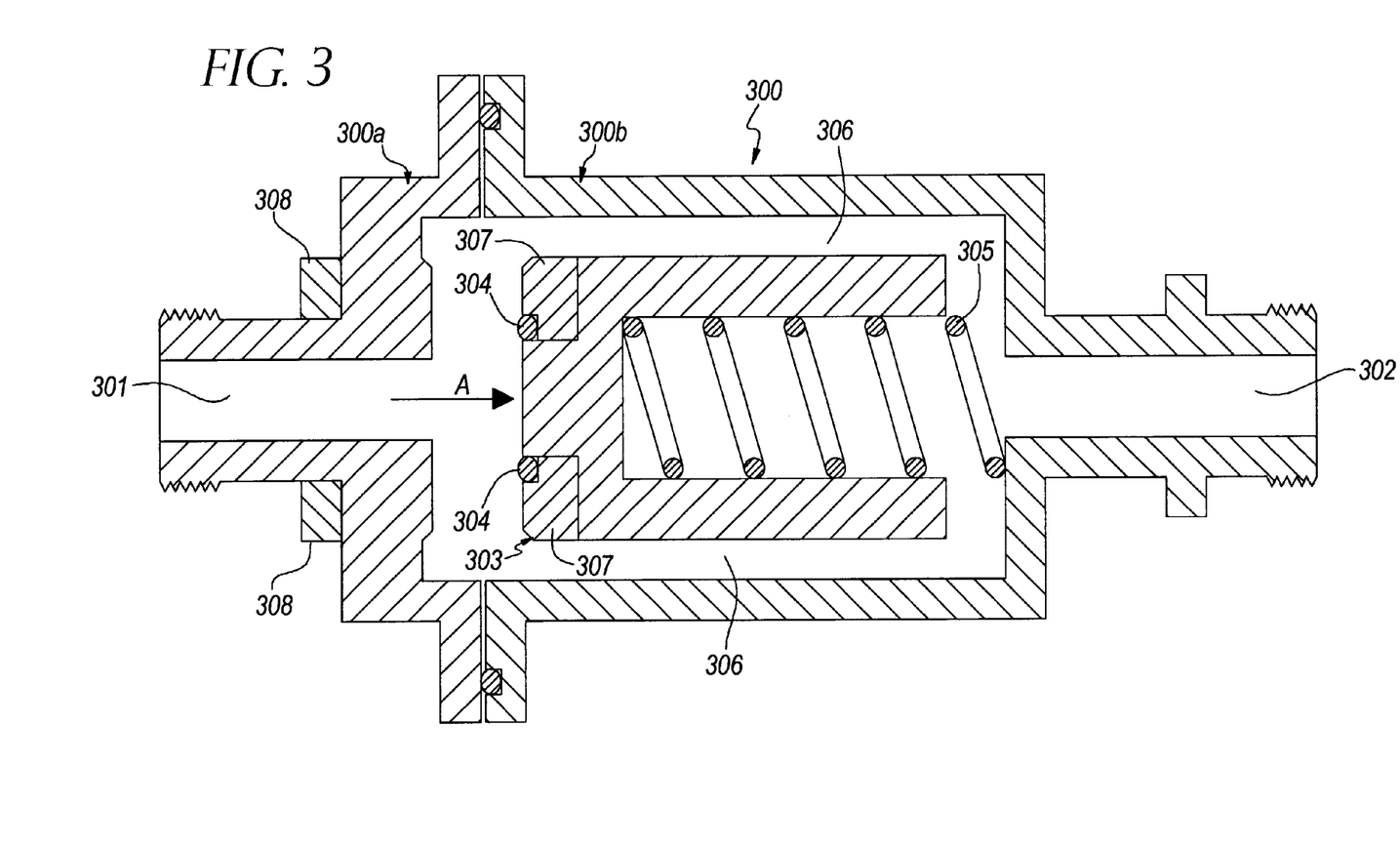
FIG. 3 illustrates another embodiment of a non-actuated non-return valve of the invention.

FIG. 3 illustrates an additional embodiment of a non-actuated non-return check valve 300 of the invention. In similar fashion to the embodiment illustrated in FIG. 2, check valve 300 includes a first body half 300a, a second body half 300b, a flow inlet 301, a flow outlet 302, a seal 304, a sealable surface 309, a flow check assembly 303, a biasing spring 305, and an internal flow passage 306. However, in this embodiment the distal ends of flow assembly 303 do not include magnetic portions in the embodiment illustrated as check valve 300. Alternatively, check valve 300 includes magnetic portions 307 positioned on the flow check assembly 303 proximate first body half 300a. Therefore, in similar fashion to the operation of check valve 200, magnets 308 may be positioned about the exterior of first body half 300a in order to impart longitudinal movement to check valve assembly 303, which may operate to separate seal 304 from sealing surface 309 and allow gas to flow therethrough. However, in order for magnet 308 to impart longitudinal movement to flow check assembly 303 in the direction indicated by arrow A, magnet 308 must be of the same polarity as magnetic portion 307. Therefore, for example, magnet 308 may have a positive polarity, while magnetic portion 307 of flow check assembly 303 may also have a positive polarity. In this configuration, the positive polarities of magnets 308 and magnetic portions 307 results in a repulsive force being exerted upon magnetic portion 307 by magnets 308. This repulsive force operates to bias magnetic portions 307 away from magnet 308, which results in flow check assembly 303 being longitudinally actuated in the direction of arrow A. As noted above, this longitudinal actuation operates to separate seal 304 from sealing surface 309, which allows gas to pass through check valve 300 via internal flow passage 306.

Although the embodiments of the invention shown in FIGS. 2 and 3 illustrate that external magnets may be applied to the respective check valves at specific locations, the present invention contemplates the application of an external magnet to various portions of the respective check valves. Therefore, the external magnet may be applied to a central portion of the respective check valves, assuming that the internal magnetic portion of the respective flow check assembly were positioned to be effectively actuated by the position of the external magnet. Furthermore, although not expressly recited in the description of each of the embodiments of the invention, the body halves/portions/members of the respective valves are contemplated as being manufactured from a material that allows magnetic fields to permeate therethrough.

Figure 4:
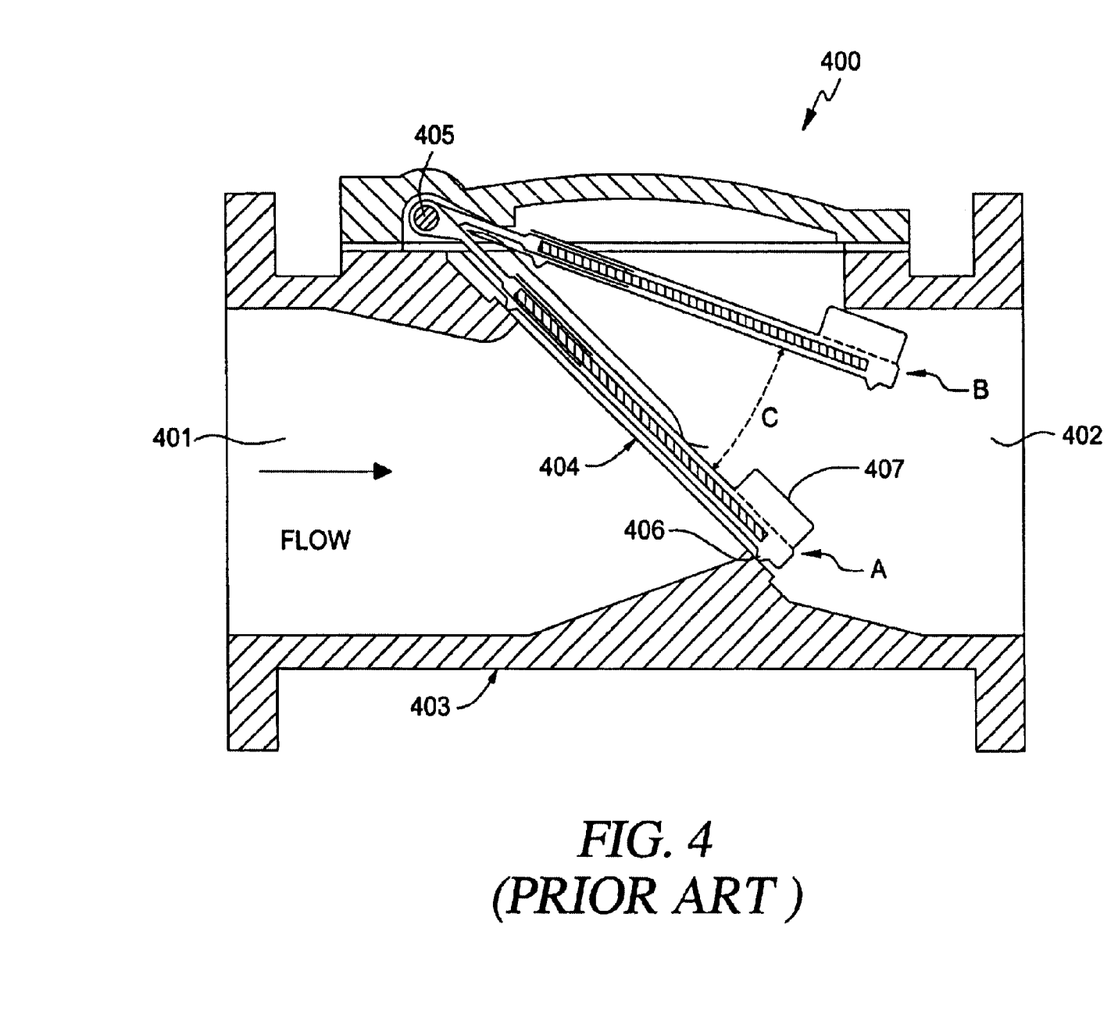
FIG. 4 (Prior Art) illustrates a conventional lever/flap-type non-actuated non-return valve.

FIG. 4 illustrates a conventional flap and/or lever-type check valve 400. Conventional check valve 400 includes a valve body 43 connecting a valve inlet 401 to a valve outlet 402 through a substantially hollow portion. A valve flap/arm assembly 404 is positioned within the substantially hollow interior portion and pivotally mounted about arm pivot assembly 405 at a first end of valve/flap arm assembly 404. A second end of valve flap/arm assembly 404 includes a first seal 406 and a second seal 407. First seal 406 is generally configured to engage a lower portion of the inner surface of valve body 403 in order to stop the flow of gas from valve inlet 401 to valve outlet 402, and vice versa. Second seal 407 is generally configured to engage an upper surface of the interior portion of valve body 403, which allows gas to flow through valve inlet 401 to valve outlet 402, and vice versa. The position of valve flap/arm assembly 404 is generally biased toward the closed position by a biasing spring 410. Therefore, arm pivot assembly 405 essentially allows valve flap/arm assembly 404 to pivot about the axis of arm pivot assembly 405 in the direction indicated by arrow C. Thus, when there is no gas pressure at valve inlet 401, biasing spring 410 will bias valve flap/arm assembly to a closed position as indicated by arrow A. Alternatively, when there is a gas pressure at valve inlet 401 sufficient to overcome the force exerted upon valve flap/arm assembly 404 by biasing spring 410, valve flap/arm assembly 404 will pivot in the direction indicated by arrow C about arm pivot assembly 405 to the open position, as indicated by position B.

Figure 5:
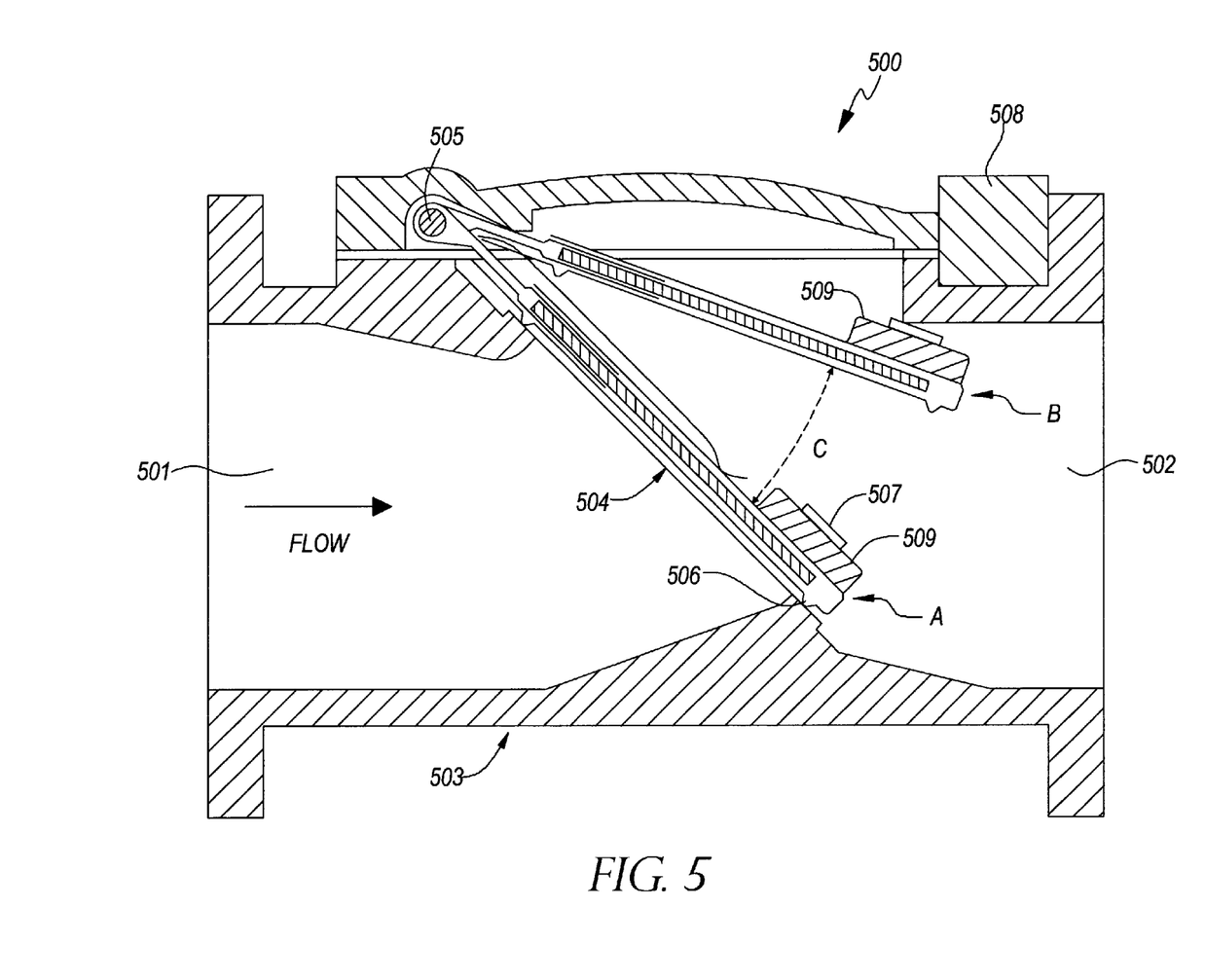
FIG. 5 illustrates an embodiment of lever/flap-type non-actuated non-return of the invention.

FIG. 5 illustrates an embodiment of a non-actuated non-return/check valve 500 of the invention. Valve 500 includes a valve body 503 forming a substantially hollow interior portion between valve inlet 501 and valve outlet 502. The substantially hollow interior portion includes a valve flap/arm assembly 504 pivotally positioned within the substantially hollow interior portion via arm pivot assembly 505. Arm pivot assembly 505 includes first seal 506 positioned at a distal end, and a second seal 507, positioned opposite seal 506. Additionally, valve flap/arm assembly 504 includes a magnetic portion 509 positioned proximate the distal end of valve flap/arm assembly 504. Therefore, when an external magnet 508 is applied to valve 500, an attractive force is exerted upon magnetic portion 509 by magnet 508, which operates to actuate valve flap/arm assembly 504 in the direction indicated by arrow C. Thus, through placement of magnet 508 proximate the exterior of valve body 503 in the position indicated in the FIG. 5, the valve flap/arm assembly 504 may be manually actuated from a closed position, indicated by arrow A, to an opened position, indicated by arrow B. In similar fashion to previous embodiments, magnet 508 may be manufactured in a conspicuous configuration, such that once placed upon check valve 500, the user would be readily able to determine that the operation of valve flap/arm assembly 504 had been bypassed via the application of magnet 508 to check valve 500.

Figure 6:
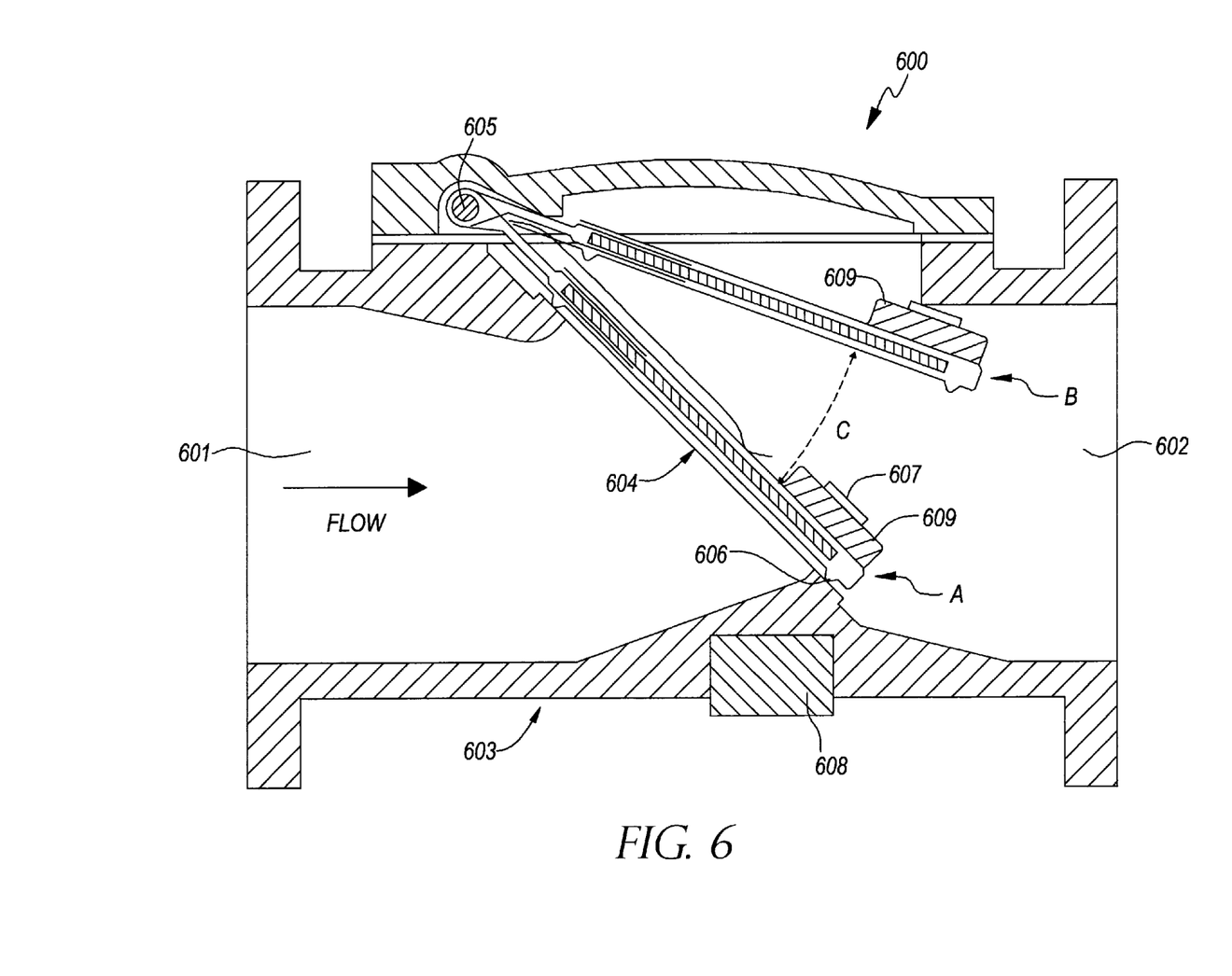
FIG. 6 illustrates another embodiment of a lever/flap-type non-actuated non-return valve of the invention.

FIG. 6 illustrates an embodiment of a non-actuated non-return check valve 600 of the invention. Check valve 600, in similar fashion to check valve 500, includes an inlet 601, an outlet 602, a valve body portion 603, an arm pivot assembly 605, a valve flap/arm assembly 604, a first seal 606, a second seal 607, and a magnetic portion 609. However, valve flap/arm assembly 604 of check valve 600 may be actuated by magnet 608, wherein magnetic 608 is positioned proximate a lower portion of valve body 403. Therefore, in contrast to check valve 500 shown in FIG. 5, check valve 600 utilizes a repulsive force to actuate valve flap/arm assembly 604 in the direction indicated by arrow C in order to bias the valve to an open position. Therefore, the magnetic portion 609 affixed to valve flap/arm assembly 604 is generally of the same polarity as magnet 608. As such, when the polarities of magnet 608 and magnetic portion 607 are identical, there is repulsive force between magnet 608 and magnetic portion 607 that causes valve flap/arm assembly 604 to be actuated in the direction indicated by arrow C. As such, when the user manually places magnet 608 proximate the lower portion of valve 603, valve flap/arm assembly 604 is caused to pivot about arm pivot assembly 605 in the direction indicated by arrow C to manually bias the valve to an open position, which is indicated by arrow B. Once magnet 608 is removed from the exterior surface of check valve 600, the repulsive force exerted on valve flap/arm assembly as a result of the similar polarity of magnetic portion 607 and magnet 608 is removed, and therefore, valve flap/arm assembly 604 is allowed to return to a closed position, as indicated by arrow A.

In similar fashion to previous embodiments, magnets 608 may be manufactured of a conspicuous material, such that a user applying magnet 608 to valve 600 would readily notice that the function of valve 600 had been disabled via application of magnet 608 thereto. As such, when the user applies magnet 608 to check valve 600, it both allows the user to perform operations such as outgassing and/or leak checking of the conduit in communication with check valve 600, but also provides a conspicuous method for determining whether the valve assembly of check valve 600 is in a bypassed or a normal operational mode.

Figure 7:
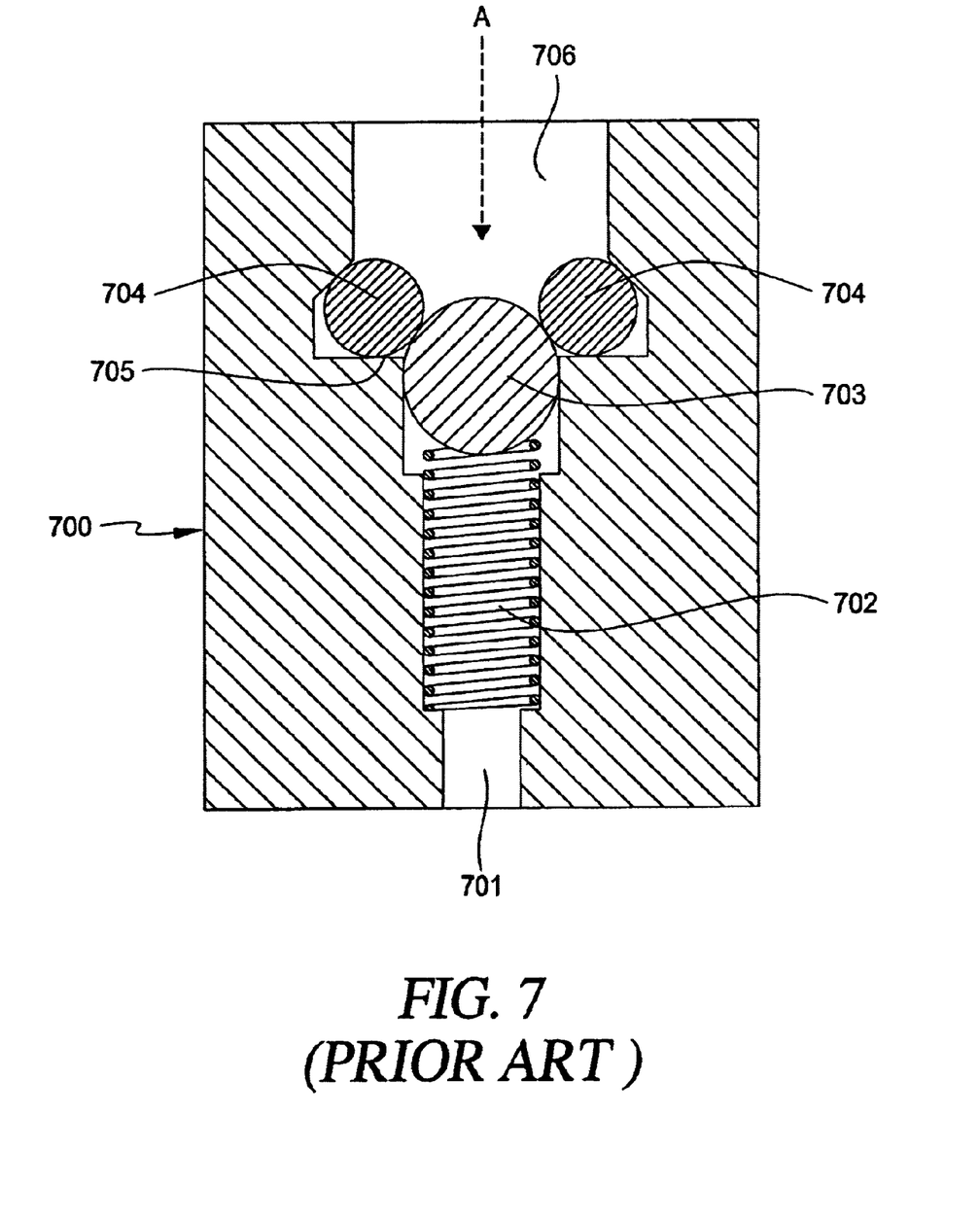
FIG. 7 (Prior Art) illustrates a conventional ball-type non-actuated non-return-type valve.

FIG. 7 illustrates an embodiment of a non-actuated ball-type non-return/check valve 700. Check valve 700 includes a valve housing 710 forming a substantially hollow inner flow passage 709 that is configured to interconnect a valve inlet 706 to a valve outlet 701. A ball sealing device 704 is generally positioned proximate valve inlet 706. The valve sealing device 704 is configured to receive a primary ball valve device 703 therein at a sealing surface 705. The engagement of primary ball valve 703 with ball sealing device 704 cooperatively operates to restrict and/or allow gas flow through inlet 706 to inner flow passage 709 and finally out the outlet 701. Further, a biasing spring 702 is provided on the outlet side of check valve 700 and is configured to bias primary ball valve 703 in the direction of ball sealing device 704. Therefore, biasing spring 702 operates to discontinue and/or stop the flow of gas from valve inlet 706 to valve outlet 701 during normal operation.

However, when sufficient pressure is present on the inlet side of valve 700, this pressure operates to longitudinally actuate primary ball valve 703 in the direction indicated by arrow A. When primary ball valve 703 is actuated in the direction of arrow A, primary ball valve 703 separates from the sealing surface 705 of ball sealing device 704, which allows gas to flow through inlet 706 to outlet 701 via inner flow passage 709. However, when the pressure on the outlet side of check valve 700 becomes greater than the pressure on the inlet side of check valve 700, biasing spring 702 automatically biases primary ball valve 703 towards ball sealing device 704, such that primary ball valve 703 engages sealing surface 705 to stop any gas flow valve 700. However, in similar fashion to previous conventional embodiments, check valve 700 does not allow the user to perform outgassing and/or leak checking of the conduit to which check valve 700 is in communication with.

Figure 8:
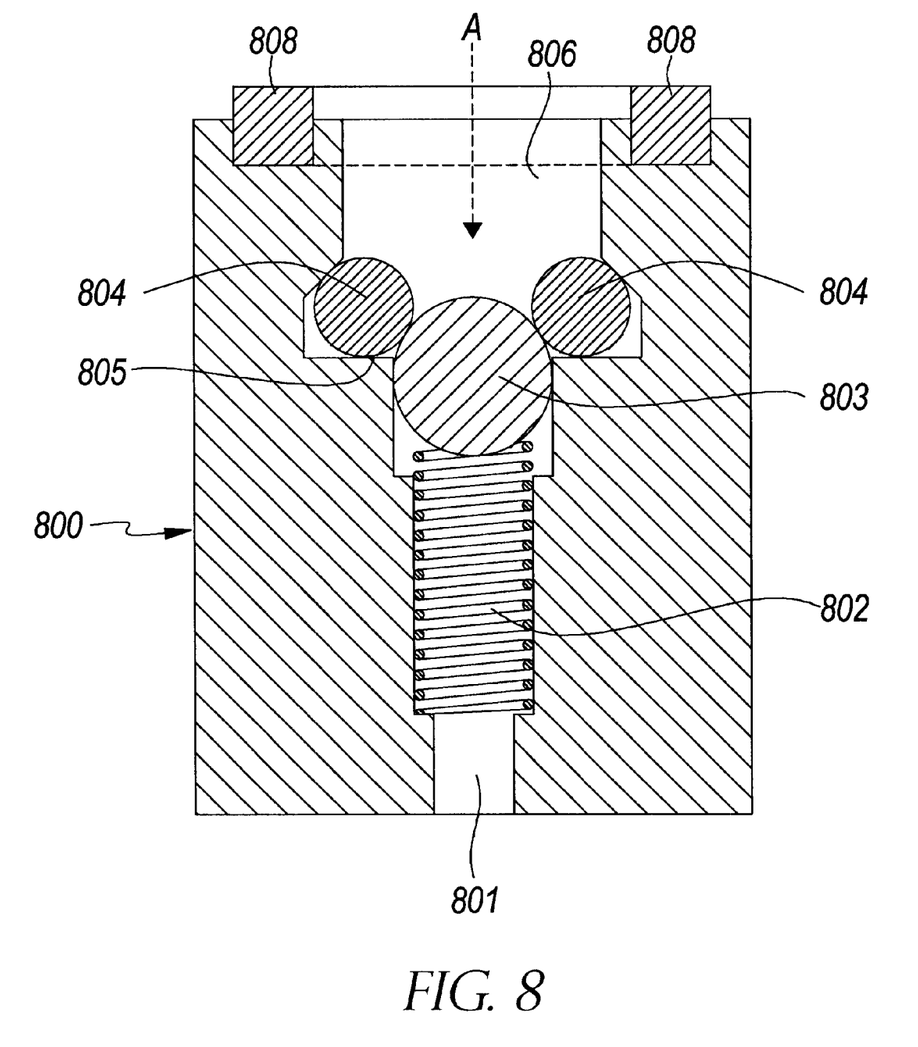
FIG. 8 illustrates an embodiment of a non-actuated ball-type non-return valve of the invention.

FIG. 8 illustrates an embodiment of a non-actuated ball-type non-return/check valve 800, wherein check valve 800 is configured to allow the user to manually override the primary ball valve 803 being biased against ball sealing device 804 by biasing spring 802. In particular, check valve 800 includes a magnetic device 808 that may be externally applied to check valve 800 in order to bias check valve 800 to an open position regardless of the pressure present on the inlet and/or outlet side of valve 800. In particular, magnetic device 808 may be configured to have a positive polarity. Further, primary ball valve 803 may be manufactured of a material also configured to have a positive polarity. Therefore, when the magnetic device 808 is positioned proximate the exterior of valve housing 810, a repulsive magnetic force is generated between magnetic device 808 and the positively charged ball valve 803. This repulsive magnetic force operates to actuate primary ball valve 803 longitudinally within valve housing 810 in the direction indicated by arrow A. As a result of this longitudinal actuation, primary ball valve 803 is caused to separate from ball sealing device 804 at sealing surface 805, and therefore, allows gas to flow through inlet 806 to outlet 801 via inner flow passage 809.

Therefore, a user of the embodiment of the check valve illustrated in FIG. 8 may apply an external magnetic source 808 to valve housing 710 in order to manually actuate the internal valve components in order to allow for the flow of gases therethrough. Therefore, although valve 800 does not include a solenoid or the electrical components necessary to actuate a solenoid-type non-return valve, the user of the non-actuated non-return/check valve 800 may utilize the application of external magnetic devices 808 in order to manually actuate valve 800. Furthermore, the externally applied magnetic device 808 may be manufactured in a conspicuous figuration, such that the user may easily recognize when the magnetic device 808 is applied to valve 800, and therefore, also easily recognized when the flow control features of valve 800 have been disabled through the application of the external magnetic device 808.

Figure 9:
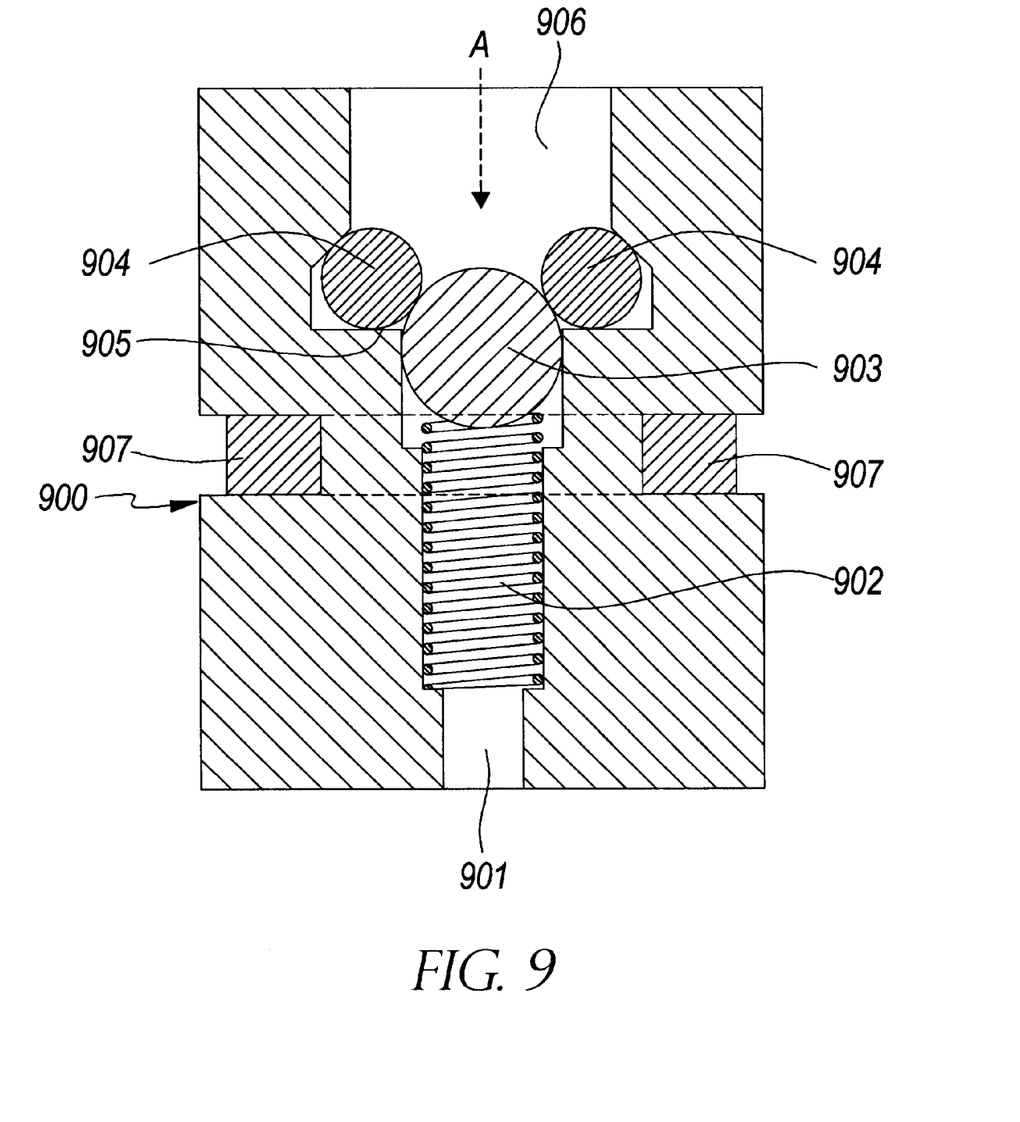
FIG. 9 illustrates another embodiment of a non-actuated ball-type non-return valve of the invention.

FIG. 9 illustrates an additional embodiment of a non-actuated ball-type non-return/check valve 900. Check valve 900, in similar fashion to check valve 800, includes a valve housing 910, valve inlet 906, a ball sealing device 904, a primary ball valve 903, a sealing surface 905, a biasing spring 902, an inner flow passage 909, and a valve outlet 901. Additionally, valve 900 includes an externally applied magnetic device 907 positioned proximate the middle of valve housing 910. In this configuration, primary ball valve 903 may be manufactured of a magnetic material. Further, magnetic device 907 may be positioned proximate primary ball valve 903, thereby allowing magnetic device 907 to exert an attractive force upon primary ball valve 903. As such, when magnetic device 907 is positioned proximate ball valve 903 through placement of magnetic device 907 about the exterior valve housing 910, magnetic device 907 may operate to attract primary ball valve 903 thereto. This causes longitudinal movement of primary ball valve 903 in the direction indicated by arrow A. This longitudinal movement operates to separate primary ball valve 903 from sealing surface 905 of ball sealing device, and therefore, allow gas to flow through inlet 906 to outlet 901 via inner flow passage 909.

Once magnetic device 907 is removed from valve housing 910, the attractive force exerted upon primary ball valve 903 is also removed, and therefore, primary ball valve will again be biased against ball sealing device 904 by biasing spring 902, which operates to stop gas flow through check valve 900. Further, once again, magnetic device 907 may be manufactured to be conspicuous to the user, so that the user may readily recognize when the flow control features of check valve 900 have been bypassed via the application of the external magnetic device 907 to valve housing 910.

Therefore, embodiments of the invention provide an apparatus and method for manually actuating a biased non-actuated flow control valve. As such, systems employing flow control valves may take advantage of the benefits of non-actuated valves, i.e., simplicity (lack of accompanying electronics and sensors required for operation) and reliability under all conditions (operational during power outage conditions), while avoiding the disadvantages associated with non-actuated valves, i.e., difficulty in evacuating the gas line on the back side of the valve.

While the foregoing is directed to embodiments of the present invention, other and further embodiments of the invention may be devised without departing from the basic scope thereof, and the scope thereof is determined by the claims that follow.

What is claimed is:

1. A magnetically actuatable non-return valve, comprising:
   a non-magnetic valve body having a substantially hollow interior portion in communication with a gas inlet and a gas outlet;
   a mechanically biased flow check assembly positioned within the substantially hollow interior portion, the mechanically biased flow check assembly being configured to permit a gas flow from the gas inlet to the gas outlet;
   a first magnetic member in communication with the mechanically biased flow check assembly within the substantially hollow interior portion and affixed to a distal end of the mechanically biased flow check assembly proximate the gas outlet; and
   a second magnetic member detachably positioned adjacent an exterior portion of the valve body,
   wherein a magnetic field of the second magnetic member is configured to impart motion to the mechanically biased flow check assembly when positioned proximate the exterior portion of the valve body.

2. The magnetically actuatable non-return valve of claim 1, wherein the mechanically biased flow check assembly further comprises:
   a first sealing surface configured to engage a second sealing surface on an interior portion of the valve body proximate the gas inlet; and
   a biasing device in mechanical engagement with a back side of the first sealing surface, the biasing device being configured to bias the first sealing surface to a position in engagement with the second sealing surface.

3. The magnetically actuatable non-return valve of claim 1, wherein the first magnetic member further comprises at least one permanent magnet affixed to a distal end of the mechanically biased flowcheck assembly proximate the gas outlet, the at least one permanent magnet being configured to react with the magnetic field of the second magnetic member.

4. The magnetically actuatable non-return valve of claim 1, wherein the first magnetic member further comprises a magnetic material affixed to a distal end of the mechanically biased flow check assembly, the magnetic material being configured to react with the magnetic field of the second magnetic member.

5. The magnetically actuatable non-return valve of claim 1, wherein the second magnetic member further comprises a permanent magnet configured to be detachably positioned about the exterior portion of the valve body so as to exert a magnetic force upon the first magnetic member.

6. The magnetically actuatable non-return valve of claim 1, wherein the second magnetic member is configured to impart motion to the mechanically biased flow check assembly sufficient to bias the mechanically biased flow check assembly to an open position while the second magnetic member is positioned adjacent the exterior portion of the valve body.

7. An improved non-return valve, comprising:
   a valve body having a substantially hollow interior portion;
   a flow check assembly positioned between a gas inlet and a gas outlet, the gas inlet and gas outlet being in communication with the substantially hollow interior portion;
   a first magnetic device affixed to a distal end of the flow check assembly proximate the gas outlet; and
   a magnetic member detachably positioned proximate an exterior portion of the valve body,
   wherein a magnetic field of the second magnetic member is configured to impart motion to the flow check assembly when positioned proximate the exterior portion of the valve body.

8. The improved non-return valve of claim 7, wherein the valve body is manufactured from a non-magnetic material.

9. The improved non-return valve of claim 7, wherein the flow check assembly further comprises:
   a flow check assembly sealing surface configured to engage an interior valve body sealing surface; and
   a biasing spring in mechanical engagement with the flow check assembly, the biasing spring being configured to bias the flow check assembly sealing surface against the interior valve body sealing surface.

10. The improved non-return valve of claim 7, wherein the first magnetic device further comprises a permanent magnetic device in mechanical communication with the flow check assembly.

11. The improved non-return valve of claim 7, wherein the first magnetic device further comprises a portion of magnetic material affixed to a distal end of the flow check assembly, the portion of magnetic material being configured to react with the magnetic field of the magnetic member.

12. The improved non-return valve of claim 7, wherein the magnetic member further comprises a permanent magnet configured to be detachably positioned about an exterior of the improved non-return valve.

13. The improved non-return valve of claim 7, wherein the magnetic member is configured to impart a valve opening motion to the flow check assembly when the magnetic member is positioned adjacent the exterior portion of the valve body.

14. The improved non-return valve of claim 7, wherein the magnetic field of the second magnetic member is configured to impart at least one of a valve closing and a valve opening motion to the flow check assembly when positioned proximate the exterior portion of the valve body.

15. An improved non-return valve, comprising:
   a valve body having a substantially hollow interior portion;
   a flow check assembly positioned between a gas inlet and a gas outlet, the gas inlet and gas outlet being in communication with the substantially hollow interior portion;
   means for interacting with a magnetic field in mechanical communication with the flow check assembly and affixed to a distal end of the flow check assembly proximate the gas outlet when open; and
   means for generating a magnetic field detachably positioned proximate an exterior portion of the valve body,
   wherein the magnetic field of the means for generating a magnetic field is configured to impart motion to the flow check assembly via the means for interacting with a magnetic field when the means for generating a magnetic field is positioned proximate the exterior portion of the valve body.

16. A method for mechanically actuating a non-return valve, comprising:
   positioning a first magnetic device on a flow check assembly within the non-return valve and affixed to a distal end of the flow check assembly proximate a gas outlet when in an open position;
   positioning a second magnetic device proximate an exterior portion of the non-return valve, and
   wherein a magnetic field generated by the second magnetic device operates to actuate the flow check assembly to the open position.

17. The method of claim 16, wherein positioning a first magnetic device further comprises affixing a permanent magnet on the flow check assembly.

18. The method of claim 16, wherein positioning a second magnetic device further comprises detachably affixing a magnetic field source to the exterior portion of the non-return valve.

19. The method of claim 18, wherein detachably affixing the magnetic field source further comprises detachably affixing a permanent magnet.

* * * * *